United States Patent [19]

Huff

[11] 3,820,630
[45] June 28, 1974

[54] JET EXHAUST NOISE SUPPRESSOR

[75] Inventor: Ronald G. Huff, North Olmsted, Ohio

[73] Assignee: The United States of America as represented by the National Aeronautics and Space Administration, Washington, D.C.

[22] Filed: Mar. 9, 1973

[21] Appl. No.: 339,806

[52] U.S. Cl. ..................... 181/33 HB, 239/265.17
[51] Int. Cl. ..................... B64d 33/06, F01n 1/14
[58] Field of Search ...... 181/33 HB, 33 HC, 33 HD; 239/265.11, 265.13, 265.17, 265.33, 265.37, 265.39

[56] References Cited
UNITED STATES PATENTS

| | | | |
|---|---|---|---|
| 2,799,990 | 7/1957 | Hausmann | 239/265.17 |
| 2,936,846 | 5/1960 | Tyler et al. | 181/33 HC UX |
| 3,174,582 | 3/1965 | Duthion et al. | 181/33 HD UX |
| 3,455,413 | 7/1969 | Henley | 239/265.13 X |
| 3,579,993 | 5/1971 | Tanner et al. | 181/33 HC X |
| 3,721,314 | 3/1973 | Hoch et al. | 181/33 HC |

FOREIGN PATENTS OR APPLICATIONS

| | | | |
|---|---|---|---|
| 871,403 | 6/1961 | Great Britain | 181/33 HC |
| 1,074,839 | 7/1967 | Great Britain | 239/265.11 |

Primary Examiner—George H. Miller, Jr.
Attorney, Agent, or Firm—N. T. Musial; J. A. Mackin; J. R. Manning

[57] ABSTRACT

Noise suppression for a jet engine exhaust is provided by an annular divergent body attached to an exhaust nozzle. The smallest diameter of the divergent body is larger than the diameter of the exhaust nozzle exit to form an annular step which produces a shock wave in the exhaust as it passes the step. An annular shroud is disposed around the divergent body and causes outside air to pass through voids in the divergent body to mix with the jet exhaust gas. The divergent body includes a plurality of channels with separators between the channels.

9 Claims, 1 Drawing Figure

PATENTED JUN 28 1974    3,820,630
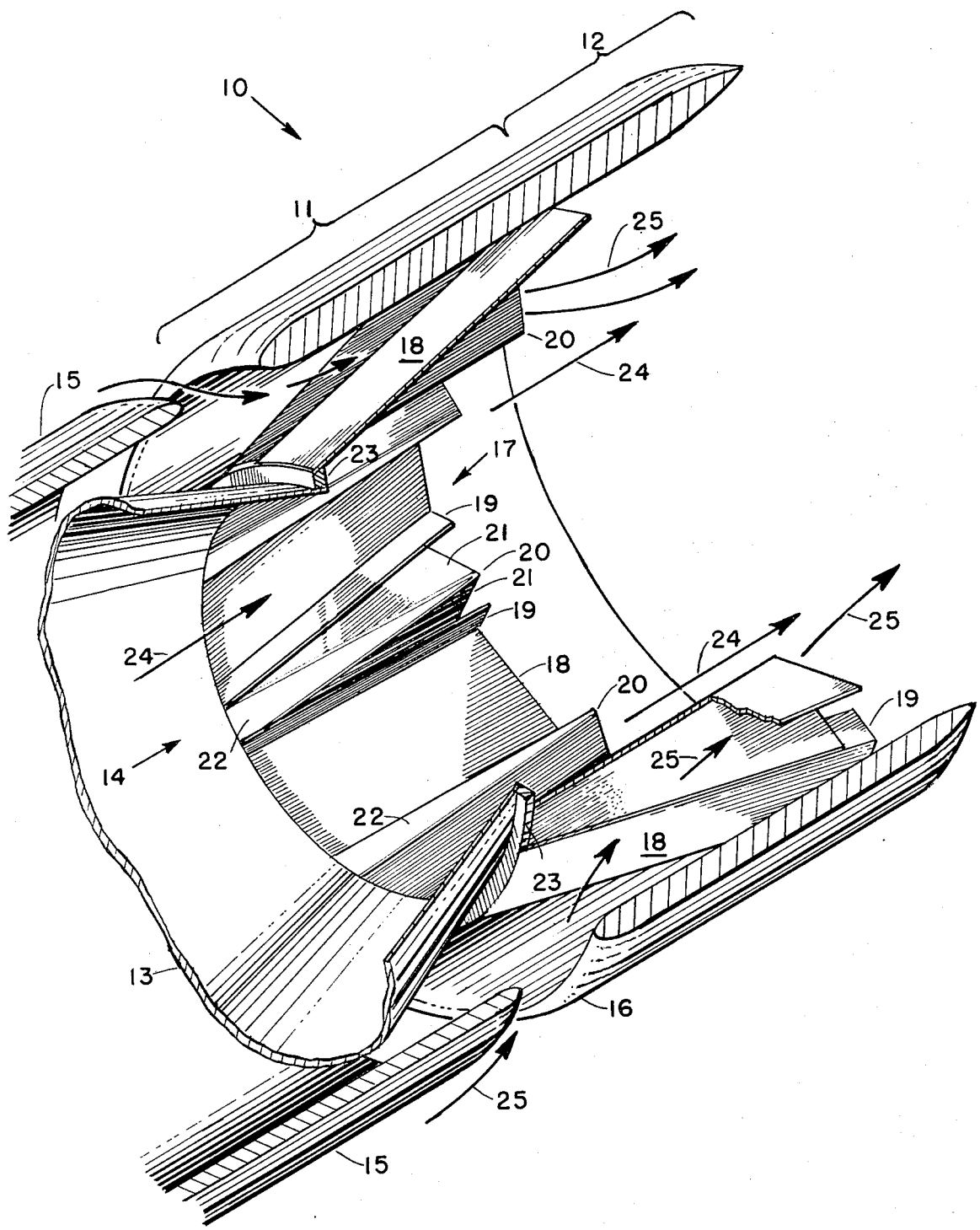

3,820,630

JET EXHAUST NOISE SUPPRESSOR

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to jet engine noise suppressors and is directed more particularly to a noise suppressor used in conjunction with the exhaust nozzle of a jet engine.

In recent years, because of the problem of jet engine noise at airports in or near residential areas, there has been a vast amount of work carried on with regard to reducing jet engine exhaust noise. As a result, there are a great number of different exhaust nozzle noise suppressors available in numerous configurations and with various modes of operation. Some of these configurations utilize multitude nozzles, converging channel members, movable louvered members, air injection, apertured acoustical liners and various combinations of these structures. In general, all of these configurations include members or components which mask or block the exhaust nozzle exit and extend into the exhaust nozzle gas jet. Many of these prior art devices have high drag configurations resulting in excessive thrust loss. Many others have severe cooling problems at present day engine operating temperatures while still others have configurations which are difficult to change or modify as may be desired for certain flight modes; for example in remote areas where noise suppression is not required.

OBJECTS AND SUMMARY OF THE INVENTION

It is an object of the invention to provide a jet exhaust noise suppressor which causes a large reduction in noise level while causing a relatively small loss of thrust.

It is another object of the invention to provide the noise suppressor adapted to be attached to the exhaust nozzle of a jet engine without blocking or obstructing the nozzle exit.

Still another object of the invention is to provide an exhaust nozzle noise suppressor which can be easily varied in configuration to suit various flight requirements.

Yet another object of the invention is to provide a jet exhaust noise suppressor which does not present severe cooling problems.

It is yet another object of the invention to provide an exhaust nozzle noise suppressor which causes the exhaust to overexpand into a cavity immediately upon exiting from the exhaust nozzle to produce a shock wave which causes the exhaust jet to become subsonic.

It is another object of the invention to provide a noise suppressor which divides an exhaust jet into separate small jets which begin to form at the point where the exhaust jet begins to overexpand upon exiting from the exhaust nozzle.

It is also an object of the invention to provide an exhaust nozzle noise suppressor in which outside air is mixed with the exhaust jet downstream of a cavity into which the exhaust jet over-expands upon exiting from the exhaust nozzle.

In summary, an exhaust nozzle embodying the invention provides an annular step at the exhaust nozzle exit whereby as the exhaust jet overexpands into a cavity portion of the noise suppressor it experiences a strong shock system and is mixed with outside air in a mixing section of the noise suppressor. The noise suppressor diverges in a downstream direction and is formed of members which cause the exhaust jet to form into lobes which begin at the exhaust nozzle exit in an area of low pressure caused by the step.

BRIEF DESCRIPTION OF THE DRAWINGS

The single FIGURE is an oblique view, partially cut away, showing an exhaust noise suppressor embodying the invention.

DESCRIPTION OF THE PREFERRED EMBODIMENT

Referring to the single FIGURE, there is shown a jet engine exhaust noise suppressor 10 having a forward cavity section 11 and a rear mixing section 12, a jet engine exhaust nozzle 13 having a nozzle exit 14 and an annular fairing 15 disposed around the exhaust nozzle and terminating at an axial position approximately even with the nozzle exit 14. The exhaust noise suppressor 10 comprises an outer annular shroud member 16 and an inner divergent member 17. The annular member 17 is made up of a plurality of channels 18, each having sidewalls 19, and gutter members 20 each having triangular sides 21 and flat triangular bottom portions 22 as shown. The sides and bottoms of the gutter members 20 are not required to be flat but may, if desired, be radiused or bowed. The channels 18 are attached to an annular flange or ring 23 which extends radially outwardly from the exhaust nozzle 13 at its exit 14 and diverges in a downstream direction to where they are attached to the inner surface of the annular shroud 16.

The exhaust gas jet flow is indicated by the arrows 24 while arrows 25 indicate the path of air flow entering through an annular gap provided between the faring 15 and the shroud 16.

The annular flange 23 forms a step which, as will be explained presently, has a significant function in the operation of the exhaust noise suppressor 10. Because the channels 18, as shown, are flat while the flange 23 is annular the step provided by the flange 23 will be much thicker adjacent to each of the sidewalls 19 of each channel 18 than at the center. The ratio of the thickness of the step to the diameter of the exhaust nozzle exit 14 as used in this specification refers to the thickness at the longitudinal center of each of the channels 18. Thus, even when the step thickness is defined as zero there will be some step thickness at each edge of each channel 18. As an alternative, the channels 18 may be given a curvature along their longitudinal axi whereby the step thickness would be constant or uniform across each channel.

The distance from the outer edge of the exhaust nozzle exit to the closest point of any channel may range from about zero to one-eighth the diameter of the exhaust nozzle exit. Preferably, the distance is about one-twenty-fourth of the diameter of the exhaust nozzle exit, the distance being the thickness of the step formed by the annular flange 23.

Operation of the exhaust noise suppressor embodying the invention will now be described. Jet exhaust gas as indicated by the arrows 24 flows out of the exhaust nozzle 13 through the exhaust nozzle exit 14. Because of the step formed by the annular flange 23, the exhaust jet overexpands into the cavity 11. An area, much lower in pressure than atmospheric, is consequently produced at the step because of the evacuating or pumping action of the jet. The exhaust gas jet senses the low pressure in the region of the step and expands supersonically until the Mach number consistent with the static pressure in the region of the step is reached.

Some of the exhaust gas jet diverges along the channels 18 forming respective lobes on the exhaust jet pattern. These lobes begin at the low pressure region produced by the step 23.

The outward turning or divergence of the supersonic flow of the exhaust jet gas along the channels 18 is in accordance with the PRANTL-MEYER expansion. Because the static pressure in the region of the step formed by the annular flange 23 is lower than atmospheric, the Mach number exceeds that which a free expansion of a jet into the atmosphere would obtain. Associated with this overexpanded Mach number is a higher total pressure loss when shocks exist in the primary jet. These shocks are of the type that may be induced in the overexpanded jet as it is exposed to the air being injected into the exhaust jet through the gutters 20 as indicated by the arrows 25.

Outside or secondary air flows, as indicated by the arrows 25, into the annular space provided between the fairing 15 and the shroud 16 and then through respective gutters 20 to mix with the primary exhaust jet. A high degree of mixing of the outside air 25 and the primary exhaust jet is obtained because the lobes produced on the exhaust jet by the channels 18 provide an increased area of jet exhaust which is exposed to the relatively low velocity outside air. This reduces the total exhaust velocity at the downstream end of the shroud 16 with the end result that the sound power level of the complete assembly is substantially lower than that which would be generated by the primary exhaust nozzle alone.

As will be apparent to those skilled in the art, the channels 18 with their sidewalls 19 and the gutters 20 may be mounted by hinges or other pivotal arrangements so they may be moved away from the exhaust jet under certain modes of operation. Other changes and modifications may also be made to the above-described exhaust noise suppressor without departing from the spirit and scope of the invention as set forth in the claims appended hereto.

What is claimed is:

1. Apparatus for suppressing the noise of a jet of gas being exhausted from the exhaust nozzle exit of a jet engine, said apparatus comprising:
    an annular body comprising a plurality of channel members separated by gutter members and attached to the nozzle and increasing in diameter in a downstream direction of the jet;
    means for producing a low pressure region around the exhaust nozzle exit; and
    an annular shroud disposed at the downstream end of said annular body
    said gutter members providing openings for the entrance of air into said exhaust jet.

2. The apparatus of claim 1 wherein said means for producing a low pressure region is an annular step formed at said exhaust nozzle exit.

3. The structure of claim 1 wherein each gutter has a longitudinally extending bottom edge substantially parallel to the longitudinal axis of said exhaust nozzle.

4. The apparatus of claim 1 wherein said gutter members have flat sides which intersect with a flat bottom surface.

5. The structure of claim 1 wherein said gutter members are longitudinally shorter than said channel members.

6. The structure of claim 1 and including a fairing disposed around the exhaust nozzle and terminating upstream of said shroud to provide an annular gap for the admission of air to said noise suppressing apparatus.

7. The structure of claim 1 wherein said channel members are flat longitudinal plates with flat sides.

8. The structure of claim 7 wherein the distance from the outer edge of the exhaust nozzle exit to the closest point of any channel ranges from about zero to one-eighth the diameter of the exhaust nozzle exit.

9. The structure of claim 8 wherein said distance is about one-twenty-fourth of the diameter of the exhaust nozzle exit.

* * * * *